United States Patent
Thimsen et al.

(10) Patent No.: US 8,776,043 B1
(45) Date of Patent: Jul. 8, 2014

(54) SERVICE IMAGE NOTIFICATIONS

(75) Inventors: John Daniel Thimsen, Seattle, WA (US); David Zipkin, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 227 days.

(21) Appl. No.: 13/248,852

(22) Filed: Sep. 29, 2011

(51) Int. Cl.
*G06F 15/177* (2006.01)
*H04L 12/28* (2006.01)
*H04L 9/32* (2006.01)
*G06F 17/00* (2006.01)
*G06F 17/27* (2006.01)
*G06F 9/44* (2006.01)
*G06F 7/04* (2006.01)

(52) U.S. Cl.
USPC ........... 717/171; 709/220; 370/254; 713/176; 715/234; 726/26; 726/4

(58) Field of Classification Search
None
See application file for complete search history.

(56) References Cited

U.S. PATENT DOCUMENTS

| | | | | |
|---|---|---|---|---|
| 4,788,637 | A * | 11/1988 | Tamaru | 717/170 |
| 5,757,908 | A | 5/1998 | Cooper et al. | |
| 5,870,717 | A | 2/1999 | Wiecha | |
| 6,735,768 | B1 | 5/2004 | Tanaka | |
| 6,910,071 | B2 * | 6/2005 | Quintero et al. | 715/234 |
| 7,089,259 | B1 * | 8/2006 | Kouznetsov et al. | 709/220 |
| 7,165,041 | B1 | 1/2007 | Guheen et al. | |
| 7,315,830 | B1 | 1/2008 | Wirtz et al. | |
| 7,324,969 | B2 | 1/2008 | Pallister et al. | |
| 7,433,835 | B2 | 10/2008 | Frederick et al. | |
| 7,466,835 | B2 | 12/2008 | Stenberg et al. | |
| 7,467,206 | B2 | 12/2008 | Moore et al. | |
| 7,729,954 | B2 | 6/2010 | Frederick et al. | |
| 7,729,955 | B2 | 6/2010 | Frederick et al. | |
| 7,778,874 | B1 | 8/2010 | Saunders | |
| 7,797,198 | B1 | 9/2010 | Frederick et al. | |
| 7,801,771 | B1 | 9/2010 | Sirota et al. | |
| 7,908,358 | B1 | 3/2011 | Prasad et al. | |
| 7,953,642 | B2 | 5/2011 | Dierks | |
| 7,958,529 | B2 | 6/2011 | Green et al. | |
| 8,005,723 | B1 | 8/2011 | Sirota et al. | |

(Continued)

FOREIGN PATENT DOCUMENTS

| | | |
|---|---|---|
| CA | 2554462 | 8/2005 |
| GB | 2426362 | 11/2006 |
| WO | WO 2005/072342 A2 | 8/2005 |

OTHER PUBLICATIONS

Ebay, Inc.; Ebay Advertising Targeting homepage. 2012. Accessed Feb. 17, 2012. http://www.ebayadvertising.com/en/display-ads-targeting. 1 pg.

(Continued)

*Primary Examiner* — Don Wong
*Assistant Examiner* — Anibal Rivera
(74) *Attorney, Agent, or Firm* — Knobbe, Martens, Olson & Bear, LLP

(57) ABSTRACT

An electronic marketplace for service images permits users to browse descriptions of service images implementing desired functionalities of a virtual machine image. The described service images may contain one or more software applications and may be further offered for purchase through an electronic service image marketplace. Notifications, such as updates, regarding software applications contained within a service image can be uploaded to the electronic service image marketplace. The electronic service image marketplace identifies customers associated with service images containing outdated software applications and generates notifications for the customers.

29 Claims, 6 Drawing Sheets

(56) References Cited

U.S. PATENT DOCUMENTS

| | | | |
|---|---|---|---|
| 8,019,652 B1 | 9/2011 | Frederick et al. | |
| 8,019,653 B1 | 9/2011 | Frederick et al. | |
| 8,024,225 B1 | 9/2011 | Sirota et al. | |
| 8,442,234 B2 * | 5/2013 | Brown et al. | 713/176 |
| 2002/0120519 A1 | 8/2002 | Martin et al. | |
| 2003/0078850 A1 | 4/2003 | Hartman et al. | |
| 2003/0195813 A1 | 10/2003 | Pallister et al. | |
| 2003/0200185 A1 | 10/2003 | Huerta et al. | |
| 2003/0217357 A1 * | 11/2003 | Parry | 717/168 |
| 2004/0010440 A1 | 1/2004 | Lenard et al. | |
| 2004/0122926 A1 | 6/2004 | Moore et al. | |
| 2004/0243583 A1 | 12/2004 | Olsen | |
| 2005/0010916 A1 * | 1/2005 | Hagen et al. | 717/170 |
| 2005/0039034 A1 | 2/2005 | Doyle et al. | |
| 2005/0256882 A1 | 11/2005 | Able et al. | |
| 2007/0022447 A1 | 1/2007 | Arseneau et al. | |
| 2007/0067297 A1 | 3/2007 | Kublickis | |
| 2007/0130156 A1 * | 6/2007 | U. Tenhunen et al. | 707/10 |
| 2007/0233540 A1 | 10/2007 | Sirota | |
| 2007/0294399 A1 | 12/2007 | Grossner et al. | |
| 2007/0300240 A1 | 12/2007 | Viegener et al. | |
| 2008/0080396 A1 * | 4/2008 | Meijer et al. | 370/254 |
| 2008/0098462 A1 * | 4/2008 | Carter | 726/4 |
| 2009/0037337 A1 | 2/2009 | Baitalmal et al. | |
| 2009/0119779 A1 * | 5/2009 | Dean et al. | 726/26 |
| 2009/0138380 A1 | 5/2009 | Roseman et al. | |
| 2009/0144172 A1 | 6/2009 | Frederick et al. | |
| 2009/0288082 A1 | 11/2009 | Nazeer et al. | |
| 2010/0186007 A1 * | 7/2010 | Jeong | 717/170 |
| 2010/0242088 A1 * | 9/2010 | Thomas | 726/3 |
| 2010/0257043 A1 | 10/2010 | Kassael et al. | |
| 2010/0262508 A1 | 10/2010 | Volnak | |
| 2011/0119191 A1 | 5/2011 | Stern et al. | |
| 2011/0296000 A1 | 12/2011 | Ferris et al. | |
| 2012/0059917 A1 | 3/2012 | Dawson et al. | |
| 2012/0131566 A1 * | 5/2012 | Morgan et al. | 717/170 |
| 2012/0265561 A1 | 10/2012 | Patro | |
| 2013/0013533 A1 | 1/2013 | Agarwal et al. | |

OTHER PUBLICATIONS

Ranganathan et al., Advertising in a Pervasive Computing Environment, University of Illinois, 5 pages, Urbana, IL.

International Search Report and Written Opinion in PCT/US2012/057626 mailed Dec. 24, 2012.

\* cited by examiner

SERVICE IMAGE NOTIFICATIONS

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit, of the general public.

To facilitate increased utilization of data center resources, virtualization technologies allow a single physical computing device to host one or more instances of a virtual machine, which virtual machine instance appears to a user of a data center as an independent computing device. With virtualization, the host computing device can create, maintain, delete, or otherwise manage virtual machines instances in a dynamic manner. In turn, users can request computing resources from the data center, including single computing devices or a configuration of networked computing devices, and be provided with virtual machine instances that provide the requested computing resources.

An instance of a virtual machine may be configured to provide specific functionality. For example, a virtual machine instance may be associated with different combinations of software applications and operating systems or operating system configurations to enable a virtual machine to provide different desired functionalities, or to provide similar functionalities more efficiently. One or more virtual machine instance configurations are often contained within a service image, which a host computing device may execute in order to implement the desired specific functionality of the virtual machine instance.

In one embodiment, the service image, when executed by virtual machine instance, provides a network accessible service (a.k.a. Web service) corresponding to the software applications/configurations included in the service image. A network accessible service provides specific functionality to other applications and computing resources via a network through application programming interfaces (APIs), which APIs can also be considered a network accessible service or Web service. For example, a service image, when executed, may provide a network accessible database or mass storage service. Once a service image is created, it can be provided to users interested in utilizing the applications and computing resources available from a data center for specific purposes.

However, over time providers of software applications contained within service images may update the software applications to correct security issues or other bugs. Therefore, users associated with the affected service images may continue to use outdated software applications.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, where.

DETAILED DESCRIPTION

Figure 1:
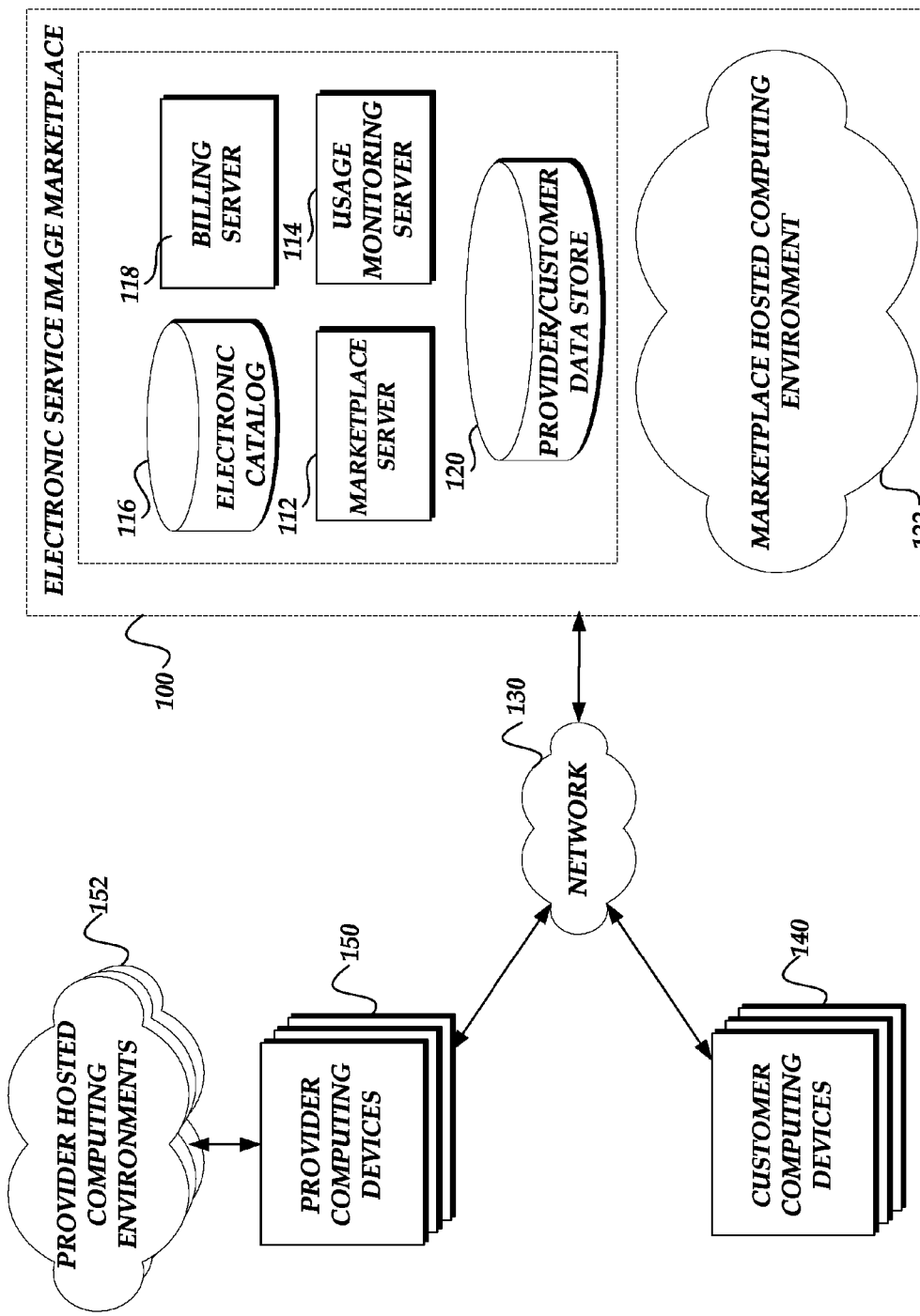
FIG. 1 is a schematic block diagram depicting an illustrative operating environment in which an electronic service image marketplace enables customers to browse and acquire service images made available in the marketplace by third party providers and the operator of the electronic marketplace.

Generally described, aspects of the present disclosure relate to providing an electronic marketplace for service images and providing notifications, such as notifications of outdated software applications, to customers of the electronic service image marketplace. More specifically an electronic service image marketplace is disclosed that enables customers to browse and acquire a large variety of service images. The service images may be submitted to the electronic service image marketplace by third party providers, or may be submitted to the marketplace by the operator of the marketplace itself. The service images can contain one or more software applications executing therein, which may also be referred to as service image software applications. Once acquired through the marketplace, a service image may be launched on a hosted computing environment maintained by the third party provider of the service image or on a hosted computing environment associated with the marketplace.

As discussed in greater detail below, embodiments of the electronic service image marketplace permit a provider to submit one or more notifications regarding software applications contained within the service images that the provider has submitted to the electronic service marketplace. A notification may include a software update for an outdated software application and/or additional information that would be useful to a customer of the service image. In some embodiments, the software application may be the service image itself.

Upon receiving the notification from the provider, the electronic service image marketplace may search an electronic catalog containing service images for affected service images (e.g., service images that contain the outdated software application), and a provider/customer data store for affected customers (e.g., customers associated with the service images containing the outdated software application). Upon retrieving the information regarding the affected customers, the electronic service marketplace can generate a notification for the affected customer including details concerning the notification. Accordingly, customers associated with service images that contain one or more outdated software applications can be notified of the outdated software application(s). As a result, the electronic service image marketplace may receive a request from a customer to update the software application, or the customer may choose to continue using the service image with the outdated software application(s).

Embodiments discussed below may refer to the users of an electronic marketplace for service images as customers. However, it may be understood that users are not limited to customers but may include owners, administrators, end users and providers of service images purchased from the electronic marketplace.

Embodiments of an electronic marketplace for service images may be found in U.S. patent application Ser. No. 13/248,227, filed on Sep. 29, 2011, and entitled, "ELECTRONIC MARKETPLACE FOR HOSTED SERVICE IMAGES," (the "'227 application") the entirety of which is hereby incorporated by reference. In brief, the electronic service image marketplace may provide an environment with which both providers and customers of service images can interact via a network. In one embodiment, a provider may submit a service image to the electronic service image marketplace for inclusion in an electronic catalog. The provider may submit additional information corresponding to the service image that would be useful to a customer, such as pricing information, usage conditions, a location of a provider hosted computing environment on which the service image can be hosted, or other information.

Customers may employ a user computing device to browse the electronic catalog by interaction with various user interfaces generated by the electronic service image marketplace, described in greater detail below. Upon identifying a service image of interest, the customer may view details of each service image in the electronic catalog, such as the information submitted by the provider of the service image. In some embodiments, a customer may view further information associated with a service image, such as usage statistics by other marketplace customers of the service image, reviews by other customers, or recommendations for similar or complementary service images. Accordingly, service images may be surfaced to customers in a variety of ways by the electronic service image marketplace, such as by navigation through a browse tree of services organized by function, type, size, etc. or through recommendations, reviews, etc.

Once a customer selects a service image, the customer may purchase or otherwise acquire the service from the electronic service image marketplace. In some embodiments, the customer may be required to submit payment information for the service image prior to launch of the service image. After acquisition of the service image by the customer, the service image may be launched and executed by one or more hosted computing environments. The hosted computing environment may be provided by an operator of the electronic service image marketplace or may be otherwise associated with the electronic service image marketplace. In some embodiments, the third party provider of the acquired service image may provide a hosted computing environment for the service image acquired by the customer via the electronic service image marketplace.

Once the service image is launched and running on a hosted computing environment, the electronic service image marketplace can monitor the usage of functionality or services provided by service image and bill the customer/pay the provider accordingly. Moreover, the electronic service image marketplace may provide the customer with tools to manage, monitor, modify, etc. the service image.

In accordance with embodiments of the present disclosure, the electronic service image marketplace may permit a provider to submit a notification, such as an email notification, SMS or MMS notification, pop-up user interface, voice communication, control panel interaction, etc., related to one or more software applications contained within a service image. In an embodiment, the notification relates to the service image itself and/or the software application is the service image. A notification may include one or more updates regarding the software application, such as security patches, user interface improvements, bug fixes, and the like. Additional notifications may be submitted, such as future revisions of the software application, changes in usage agreements or pricing, tips for use, and the like. In addition, the notification can include additional information related to the outdated software application. For example, the notification can include a notification type, a name of the outdated software application, a name of the updated software application, notes regarding the changes made to the outdated software application, pricing information, and the like. In an embodiment, the notification can include information regarding the customers associated with service images containing the software application.

As an example, and not to be construed as limiting, the electronic service image marketplace may receive a notification in the form of a control panel interaction from a provider that Database v. 1.0 needs to be updated to v. 1.5. The notification includes the file for the outdated software application (v. 1.0) and the updated software application (v 1.5), as well as additional information regarding the update, such as that the update fixes a number of login security issues and improves the user interface. In addition, the notification provides an identifier for the outdated software application as "X6520" and another identifier for the updated software as "X6525." In some instances, the electronic service image marketplace may receive multiple outdated software applications from the provider, such as multiple versions of a software application, that need to be updated, as well as identifiers for each software application. Using the example provided, the electronic service image marketplace may receive a notification from the provider that Database v. 1.0, 1.1, 1.2, 1.3, and 1.4 all need to be updated to v. 1.5. Accordingly, the notification may contain a unique identifier for each version of Database.

Upon receiving the notification from the provider, the electronic service image marketplace uses the information from the notification to identify affected service images. The electronic service image marketplace can identify the affected service images based on any number of different identifiers. For example, the electronic service image marketplace can use the software application name "Database" and version number "1.0," the received identifier "X6520," or use some other identifier. In an embodiment, the electronic service image marketplace compares the name of the outdated software application "Database" with the names of the software applications contained within the service images in the electronic catalog, which are also referred to as service image software applications. If a matching name is found, the electronic service image marketplace can further compare the version number of the service image software applications with the version number of the outdated software application "1.0." If the version number corresponds, the electronic service image marketplace may identify the service image software applications as outdated software applications.

Alternatively, the electronic service image marketplace can compare the outdated software application identifier "X6520" with identifiers for the service image software applications. If a service image software application contains the identifier "X6520," the electronic service image marketplace may indicate that the service image software application is outdated. As yet another example, the electronic service image marketplace may perform a hash function on the outdated software application and compare the hash result of the outdated software application with the hash results of the service image software applications. A corresponding hash result may indicate that the service image software applications are outdated. With continued reference to the example, upon reviewing the service images, the electronic service image marketplace may identifies service images that contain the outdated software application. In the current example, the electronic service image marketplace identifies two service images (e.g., serviceImage23 and serviceImage26) that include the outdated software application "Database 1.0."

The electronic service image marketplace can further include, or be in communication with, a provider/customer data store that includes information regarding all of the providers and customers registered with the electronic service image marketplace. For the customers in the provider/customer data store, the provider/customer data store can include information regarding which service images are associated with the customer and the software applications contained within the service images. Upon identifying the affected service images (e.g., serviceImage23, serviceImage26), the electronic service image marketplace may retrieve information regarding the affected customers (i.e., customers associated with the service images containing the outdated software application) from the provider/customer data store. In the current example, the electronic service image marketplace identifies two customers (e.g., Customer5, Custerom8) that are associated with the affected service images (e.g., serviceImage23, serviceImage26).

Once the affected customers (e.g., Customer5 and Customer8 in the current example) are identified, the electronic service image marketplace generates a notification for Customer5 and Customer8. The notification for Customer5 and Customer8 can include information similar to the information in the notification received by the electronic service image marketplace from the provider in the form of an email, control panel message, pop-up user interface, text message, and the like. In addition, the notification for Customer5 and Customer8 can enable the customer to select whether they want the update from Database 1.0 to Database 1.5 to occur. Alternatively, the notification for Customer5 and Customer8 can include information that Database 1.0 has already been updated to Database 1.5.

With reference to FIG. 1, an illustrative operating environment is shown which includes an electronic service image marketplace 100 that enables customers to browse descriptions of service images. The electronic service image marketplace 100 may further enable customers to acquire service images made available in the electronic service image marketplace 100 by providers or the operator of the electronic marketplace. Acquired service images may be executed within a hosted computing environment, as discussed in greater detail below.

As illustrated in FIG. 1, the operating environment includes one or more provider computing devices 150 and one or more customer computing devices 140 in communication with an electronic service image marketplace 100 via a network 130. A provider, using a provider computing device 150, may submit via the network 130 a service image for a specific type of functionality to the electronic service image marketplace 100. The electronic service image marketplace 100 may make the submitted service image, as well as other service images submitted to the electronic service image marketplace 100, available to customers.

Accordingly, a customer, using his or her customer computing device 140, may communicate with the electronic service image marketplace 100 regarding service images made available by the electronic service image marketplace 100. In one embodiment a customer may communicate with the electronic service image marketplace 100 in order to browse descriptions of service images made available by the electronic service image marketplace 100. As discussed in greater detail below, the descriptions may include information regarding operational data of the respective service images. In another embodiment, a customer may communicate with the electronic service image marketplace 100 in order to acquire a desired service image. In a further embodiment, a customer may communicate with the electronic service image marketplace 100 in order to launch a service image acquired from a marketplace hosted computing environment 122 operated, maintained, provided or otherwise associated with the operator of the electronic service image marketplace 100. In alternative embodiments, where an acquired service image was submitted to the electronic service image marketplace 100 by a provider, the acquired service image may be launched in a provider hosted computing environment 152 that is operated, maintained, provided or otherwise associated with the provider.

A hosted computing environment (e.g., marketplace hosted computing environment 122, provider hosted computing environment 152) may include a collection of rapidly provisioned and released computing resources hosted in connection with the marketplace or a provider. Such computing resources may be referred to, individually, as host computing devices. The computing resources may further include a number of computing, networking and storage devices in communication with one another. In some embodiments, the computing devices may correspond to physical computing devices. In other embodiments, the computing devices may correspond to virtual machine instances implemented by one or more physical computing devices. In still other embodiments, computing devices may correspond to both virtual computing devices and physical computing devices. One example of a hosted computing environment is given in U.S. Pat. No. 7,865,586, entitled "CONFIGURING COMMUNICATIONS BETWEEN COMPUTING NODES" and issued Jan. 4, 2011, which is hereby incorporated by reference in its entirety. A hosted computing environment may also be referred to as a cloud computing environment.

Though described herein with reference to hosted computing environments associated with a provider of a service image and with the electronic service image marketplace 100, in some embodiments, additional hosted computing environments may be utilized. For example, a customer computing device 140 may provide a customer hosted computing environment (not shown), or a third party may provide a third party hosted computing environment (not shown). Any or all of these additional hosted computing environments may be accessible to the electronic service image marketplace 100, and may be utilized to host service images available from the electronic service image marketplace 100. For purposes of brevity, such additional hosted computing environments may also be referred to herein as "provider hosted computing environments."

The provider computing devices 150 and the customer computing devices 140 may communicate with the electronic service image marketplace 100 via a network 130. The provider computing device 150 or customer computing device 140 may be any computing device, such as personal computer (PC), kiosk, thin client, home computer, and dedicated or embedded machine. Further examples may include a laptop or tablet computers, servers, personal digital assistant (PDA), hybrid PDA/mobile phones, mobile phones, electronic book readers, set-top boxes, cameras, digital media players, and the like.

Those skilled in the art will appreciate that the network 130 may be any wired network, wireless network or combination thereof. In addition, the network 130 may be a personal area network, local area network, wide area network, cable network, satellite network, cellular telephone network, or combination thereof. In the illustrated embodiment, the network 130 is the Internet. Protocols and components for communicating via the Internet or any of the other aforementioned types of communication networks are well known to those skilled in the art of computer communications and thus, need not be described in more detail herein.

The electronic service image marketplace 100 is illustrated in FIG. 1 operating in a distributed computing environment comprising several computer systems that are interconnected using one or more networks. More specifically, the electronic service image marketplace may include a marketplace server 112, a usage monitoring server 114, an electronic catalog 116, a billing server 118, and a provider/customer data store 120, discussed in greater detail below. However, it may be appreciated by those skilled in the art that the electronic service image marketplace 100 may have fewer or greater components than are illustrated in FIG. 1. In addition, the electronic service image marketplace 100 could include various Web services and/or peer-to-peer network configurations. Thus, the depiction of the electronic service image marketplace 100 in FIG. 1 should be taken as illustrative and not limiting to the present disclosure.

Any one or more of the marketplace server 112, the usage monitoring server 114, the electronic catalog 116, the billing server 118, and the provider/customer data store 120 may be embodied in a plurality of components, each executing an instance of the respective marketplace server 112, usage monitoring server 114, electronic catalog 116, billing server 118, and provider/customer data store 120. A server or other computing component implementing any one of the marketplace server 112, the usage monitoring server 114, the electronic catalog 116, the billing server 118, and the provider/customer data store 120 may include a network interface, memory, processing unit, and computer readable medium drive, all of which may communicate which each other may way of a communication bus. The network interface may provide connectivity over the network 130 and/or other networks or computer systems. The processing unit may communicate to and from memory containing program instructions that the processing unit executes in order to operate the respective marketplace server 112, usage monitoring server 114, electronic catalog 116, billing server 118, and provider/customer data store 120. The memory may generally include RAM, ROM, and/or other persistent and auxiliary memory.

With further reference to FIG. 1, illustrative components of the electronic service image marketplace 100 will now be discussed. The marketplace server 112 may facilitate network submission by providers, and browsing and acquisition by customers, of service images in the electronic service image marketplace 100. Accordingly, a provider, utilizing a provider computing device 150, may submit one or more service images to the electronic service image marketplace 100 via the marketplace server 112. The submitted service images may then be included in an electronic catalog 116. The process by which a provider, utilizing a provider computing device 150, submits a service image to the electronic service image marketplace 100 is described in greater detail in the '227 application.

The electronic catalog 116 may include information on service images available from a plurality of providers and on service images made available by the operator of the electronic service image marketplace 100. Accordingly, the marketplace server 112 may obtain service image information for service images offered by a plurality of providers and the electronic service image marketplace 100 and make the service images available to a customer from a single network resource, such as a Web site. A customer may then acquire the service image from the electronic service image marketplace 100 and launch the service image in a hosted computing environment (e.g., the marketplace hosted computing environment 122 or the provider hosted computing environment 152) in a single interaction or order placed with the electronic service image marketplace 100. Beneficially, this eliminates the need for the customer to develop his or her own service image; or research, search or otherwise investigate multiple different providers or other sources for the service image. The electronic catalog may be a catalog containing information regarding both items (such as goods and services) and service images, or may be separate catalogs, with one catalog containing information regarding items and the other catalog containing information regarding services images, without departing from the scope of the present disclosure.

Illustratively, marketplace server 112 may generate one or more user interfaces through which a customer, utilizing a customer computing device 140, may browse service images made available by the electronic service image marketplace 100, submit queries for matching service images, and view information and details regarding specific service images. An illustrative process by which a customer computing device 140 may query the electronic service image marketplace 100, and by which the marketplace server 112 generates a user interface, may be found in the '227 application.

After the customer selects a desired service image from the electronic service image marketplace 100, the marketplace server 112 may facilitate the configuration and acquisition of the service image and cause the launching of the service image on a hosted computing environment. In this regard, the marketplace server 112 may receive payment information from the customer computing device 140, as well as information specifying how the service image should be implemented by a hosted computing environment. In some embodiments, the customer may select a specific hosted computing environment to host the selected service image. The specific hosted computing environment may correspond, for example, to the marketplace hosted computing environment 122 associated with the electronic service image marketplace 100, or to a provider hosted computing environment 152 which is associated with the provider of the service image.

Once the service image is launched and running on a hosted computing environment, the electronic service image marketplace 100 can monitor the usage of functionality or services provided by service image and bill the customer/pay the provider accordingly via the usage monitoring server 114 and the billing server 118, respectively. Moreover, the electronic service image marketplace 100 may provide the customer with tools to manage, monitor, modify, etc. the service image. In the illustrated example, the usage monitoring server 114 may be in communication with the marketplace hosted computing environment 122, and is operable to track a usage of the functionality (e.g., Web service) provided by the executed service image. This configuration may be beneficial, for example, where pricing of the service image is dependent on usage of the Web services produced by the service image when executed.

In addition, the electronic service image marketplace 100 may supply providers with tools to manage, monitor, modify, etc. their uploaded service images and software applications contained within the service images. For example, the electronic service image marketplace 100 may supply providers with the ability to upload software application updates and notifications for customers associated with service images containing outdated software applications. In some embodiments, the outdated software applications may be a service images itself. In this regard, the marketplace server 112 may receive one or more notifications of outdated software applications from a provider via a provider computing device 150. Upon receiving the notification of the outdated software application, the marketplace server 112 can identify service images within the electronic catalog 116 that contain the outdated software application. Upon identifying the service images that contain the outdated software application, the marketplace server 112 can identify any affected customers. To identify the affected customers, the marketplace server 112 can utilize information maintained in a provider/customer data store 120, which will be described in greater detail below. Upon retrieving the affected customer information, the marketplace server 112 can generate a notification, containing the details of the notification received from the provider, to the affected customers. The notification can be generated and transmitted in the form of an email, pop-up user interface, control panel message, text message, voicemail, or some other format that is able to convey the information to the customer.

The billing server 118, on the other hand, may be provided to process payments from customers and, in some embodiments, provide payment to the providers of acquired service images. The billing server 118 may receive and provide payment information via an interaction with the marketplace server 112. In some embodiments, the billing server 118 may alternatively receive and provide payment information via other processes, such as via an additional server, via telephonic interaction, or other mechanisms.

The provider/customer data store 120 can contain information regarding the various providers that have submitted service images to the electronic catalog 116, as well as information regarding customers associated with one or more service images in the electronic catalog 116. The provider information may include a list of service images and/or software applications that have been provided by the provider as well as usage details concerning each of the supplied service images. The customer information can include information regarding the service images in the electronic catalog 116 that are associated with the customer, the software applications contained within the service images, as well as the number of instances of each service image in use by the customer. A customer may be associated with a service image in any number of ways. For example, a customer may be associated with service images that the customer has acquired, is considering acquiring (e.g., on a watch list), and/or has used in the past. Alternatively, a customer can be associated with service images about which the customer wishes to receive notifications. As mentioned previously, the information contained within the provider/customer data store 120 can be used to identify customers affected by software updates or notifications submitted by providers.

Figure 2:
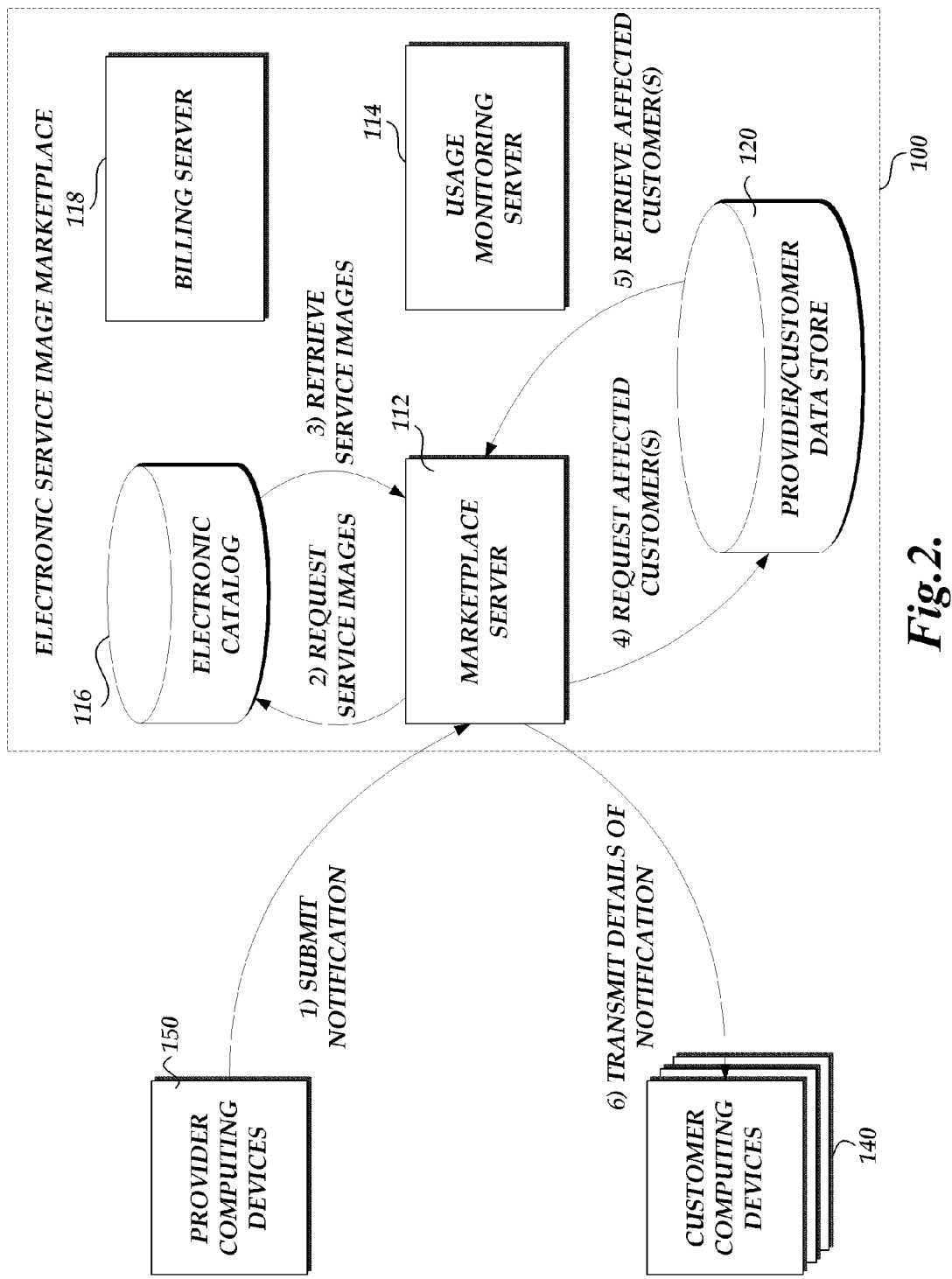
FIG. 2 is a schematic block diagram depicting a marketplace server of the electronic service image marketplace receiving a notification regarding a service image and transmitting the details of the notification to a customer computer device.

With reference to FIG. 2, an illustrative interaction for providing a notification to an affected customer that a software application contained within a service image is out of date. As depicted in FIG. 2, the provider computing device 150 submits a notification on behalf of an associate provider, such as a software update for one or more software applications contained within one or more service images and information corresponding to the notification, to the electronic service image marketplace 100. Alternatively, customers and/or the service image marketplace can also submit notifications. The notification can be in the form of an email message, control panel interaction, file upload, or the like. The submission is then processed by the marketplace server 112. The provider, utilizing the provider computing device 150, may submit information, such as the type of notification, the name of the outdated software application, a file of the outdated software application, an name of the updated software application, a file of the updated software application, costs associated with the update, the entity which generated the updated software application, a description of the updated software application, a list of service images that contain the outdated software application, and the like. As mentioned previously, in some embodiments the outdated software application is the service image.

In addition, the provider may submit pricing information corresponding to the updated software application. Such pricing information may, by way of example, correspond to a one time price requisition of the updated software application, a monthly subscription fee associated with the updated software application, or to a usage fee associated with the time period of use of the updated software application. For example, the submitted pricing information may reflect a monthly subscription fee for acquisition of the updated software application in addition to an hourly usage fee for use of the updated software application. A provider may optionally submit usage restrictions associated with the updated software application, such as required acceptance of an end user license agreement ("EULA"), maximum usage restrictions, or type of usage restrictions, such as limitations allowing only non-commercial use.

Upon receiving the notification, the marketplace server 112 can query the electronic catalog 116 to identify service images containing a software application that corresponds to the outdated software application received from the provider computing device 150. The marketplace server 112 can use an identifier associated with the outdated software application to identify one or more service images that contain a software application that corresponds to the outdated software application. The identifier may include the name/version of the outdated software application, a provider-provided identifier, a service image marketplace generated identifier, a serial number, or some other identifier, such as a hash result, etc.

For example, in some instances when the version number or other identifier associated with the software application is not available, the marketplace server 112 can perform a hash function on both the outdated software application, as well as the service image software applications in the electronic catalog 116. By performing the same hash function on the outdated software application and service image software applications, and comparing the results, the electronic service image marketplace 100 can identify whether the outdated software application corresponds to any of the service image software applications stored within the electronic catalog 116.

Upon identifying the affected service images (e.g., service images that contain the outdated software application), the marketplace server 112 can retrieve customer information of the customers associated with the affected service images from the provider/customer data store 120. As mentioned previously, the provider/customer data store 120 can contain information regarding the service images associated with different customers.

Upon retrieving the affected provider/customer data store 120, the marketplace server 112 can generate a notification, such as an email message, pop-up user interface, control panel message, etc., for the affected customers that contains information regarding and/or from the provider's original notification. The notification to the customer can be generated to include a number of different pieces of information. For example, the notification may include an indicator that the software application contained within a service image associated with the customer is outdated, that the customer has the option to update the outdated software application, that the software application has been updated by the electronic service image marketplace 100, payment information, and the like. In addition, the notification can include the type of updates occurring in the updated software application, such as security updates, user interface updates, and the like.

Once the marketplace server 112 generates the notification for the affected customers (e.g., customers associated with the service images that contain the outdated software application), the marketplace server 112 can transmit the notification to one or more customer computing devices 140 associated with the affected customers. As mentioned previously, the customers can be given the option to update the software application. If the customer opts to have the software application updated, the marketplace server 112 receives the request and updates the software application in the associated service image as directed with, for example, the updated version supplied by the provider.

Figure 3:
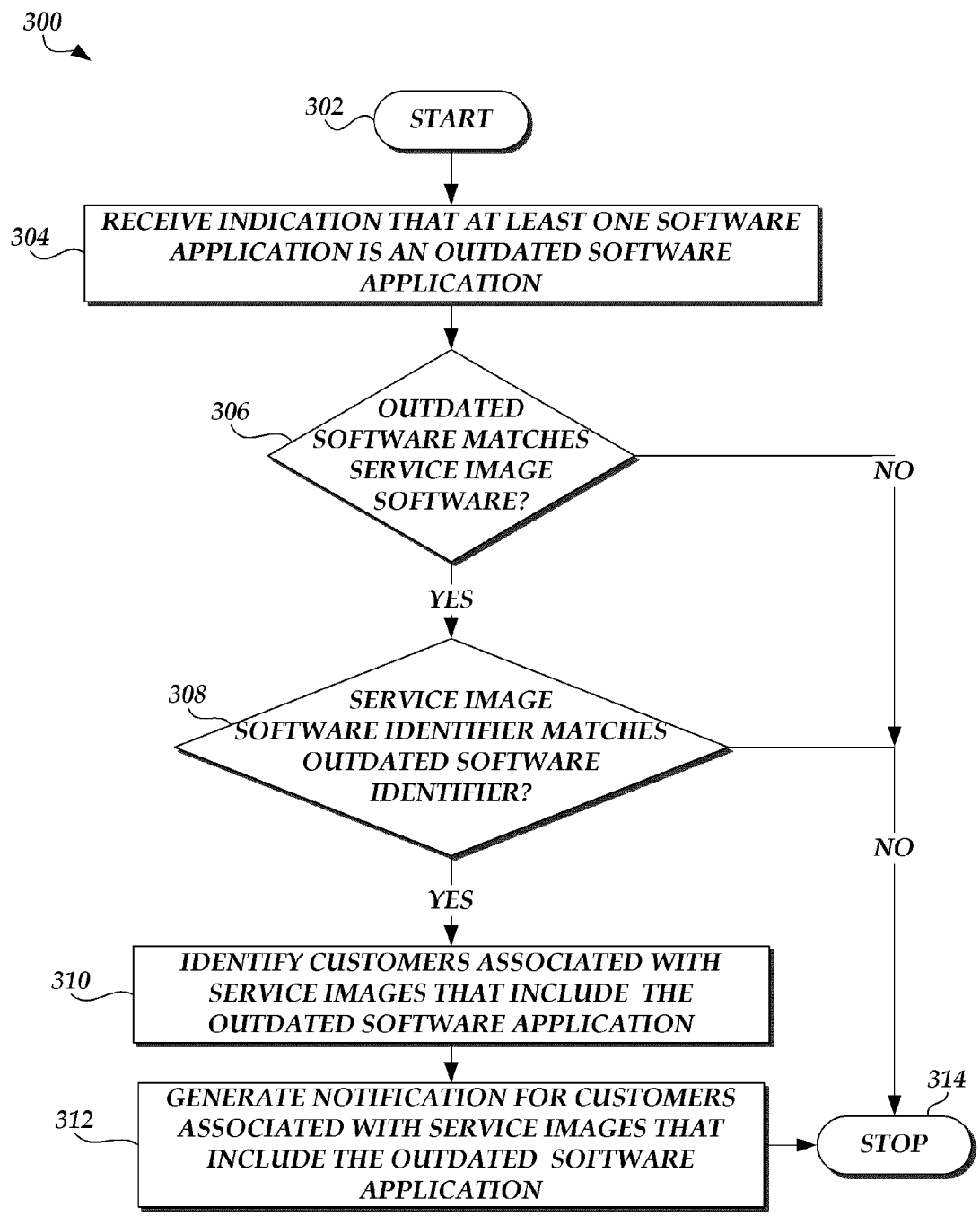
FIG. 3 is a flow diagram depicting an illustrative routine implemented by the marketplace server of the electronic service image marketplace to generate a notification regarding an outdated software application to customers associated with a service image that includes the outdated software application.

FIG. 3 is a flow diagram of an illustrative routine 300 implemented by the marketplace server 112 of the electronic service image marketplace 100 to generate a notification regarding an outdated software application to a customer associated with a service image containing an outdated software application. For example, routine 300 can apply to embodiments described in reference to FIGS. 1 and 2.

One skilled in the relevant art will appreciate that the elements outlined for routine 300 may be implemented by one or more computing devices/components that are associated with the marketplace server 112 and/or the electronic service image marketplace 100, described in greater detail above with reference to FIGS. 1 and 2. For example, routine 300 can be implemented by any one, or a combination, of marketplace server 112, the usage monitoring server 114, the billing server 118, the electronic catalog 116 and the provider/customer data store 120, and the like. Accordingly, routine 300 has been logically associated as being generally performed by a marketplace server 112, and thus, the following illustrative embodiment should not construed as limiting.

At block 304, the marketplace server 112 receives an indication, which can be in the form of an electronic notification, that at least one software application contained within a service image stored in the electronic catalog 116 is an outdated software application. In an embodiment, the software application is the service image and the notification indicates a service image is outdated. The notification that at least one software application is an outdated software application can be received from a provider using a provider computing device 150, and can be received as an email message, via a control panel interaction (e.g., the control panel described in greater detail below with reference to FIG. 5), file upload, or some other electronic or digital format. Alternatively, the indication can be received from a customer and/or the electronic service image marketplace 100. The indication can also be received as a result of a polling service that queries providers for indications of outdated software applications, a push message received from a service that provides indications of outdated software applications, or an analysis of software applications contained within service images in the electronic catalog 116 performed by the electronic service image marketplace 100. Furthermore, the indication can include a number of pieces of information, such as the name of the outdated software application, the version number of the outdated software application, an identifier of the outdated software application, a copy of the outdated software application, as well as a name of an updated software application, a copy of the updated software application, a version number of the updated software application, an identifier of the updated software application, a list of service images that contained the outdated software application, and the like. In an embodiment, the indication can include information for multiple outdated software applications, such as multiple versions of a software application or multiple different software applications. In addition, the indication can include a description of the differences between the outdated software application and the updated software application. In an embodiment, the indication includes an identifier of the customers associated with service images that include the outdated software application.

At decision block 306, the marketplace server 112 determines whether the outdated software application corresponds to a service image software application. To determine whether the outdated software application corresponds to a service image software application, the marketplace server 112 can query the electronic catalog 116 for all service images that include a software application that corresponds to the outdated software application. For example, if the outdated software application is an SQL database, the marketplace server 112 can query the electronic catalog 116 for all service images that include an SQL database. If the marketplace server 112 cannot find any service image software applications that match the outdated software application, the routine 300 will terminate as illustrated at block 314.

However, if the marketplace server 112 determines that the outdated software application corresponds to at least one service image software application, the marketplace server 112 proceeds to block 308 and determines whether an identifier associated with the service image software application corresponds to an identifier associated with the outdated software application. As mentioned previously, the identifier can include, but is not limited to, a version identifier of the software application, a hash of the software application, a serial number of the software application, and the like. If the marketplace server 112 determines that the identifier associated with the outdated software application does not correspond to the identifier associated with the service image software application then the process 300 terminates, as is illustrated at block 314.

On the other hand, if the marketplace server 112 determines that the identifier associated with outdated software application corresponds to as least one identifier associated with a service image software application, the marketplace server 112 proceeds to block 310 and identifies customers associated with service images that include software applications that match the outdated software application. As mentioned above, to identify customers associated with affected service images, the marketplace server 112 can query the provider/customer data store 120. The marketplace server 112 can identify affected customers based on the customer information from the provider/customer data store 120.

At block 312, the marketplace server 112 generates notifications for customers associated with service images that include the outdated software application. The notification can be implemented in a number of ways including, but not limited to, a control panel message (e.g., the control panel message of FIG. 6), a pop-up user interface, an email, voicemail, text message, or some other form of electronic or digital communication capable of providing the customer with the information regarding the notification. The generated notification can include information regarding the name of the outdated software application, as well as information specific to the customer, such as the number of instances of the service image that contains the software application that are currently in use, the cost of the update for the service image that contains the software application, and the like. In addition, the notification can include notes regarding the details of the update, as discussed in greater detail above. Furthermore, the customer can be given the option of whether to upgrade the outdated software application or to continue using the outdated software application. In addition, the customer can be given the option to update the outdated software application for some service images, but not others. Thus, in some embodiments, the electronic service image marketplace maintains both the outdated software application, as well as the updated software application for different service images, or instances of the software application.

One skilled in the art will appreciate that routine 300 can include fewer, more, or different blocks than those illustrated in FIG. 3 without departing from the spirit and scope of the description. For example, the routine 300 can omit decision block 306, and simply determine whether an identifier associated with a service image software application corresponds to an identifier associated with an outdated software application, as illustrated in block 308, and as explained in greater detail above.

Figure 4:
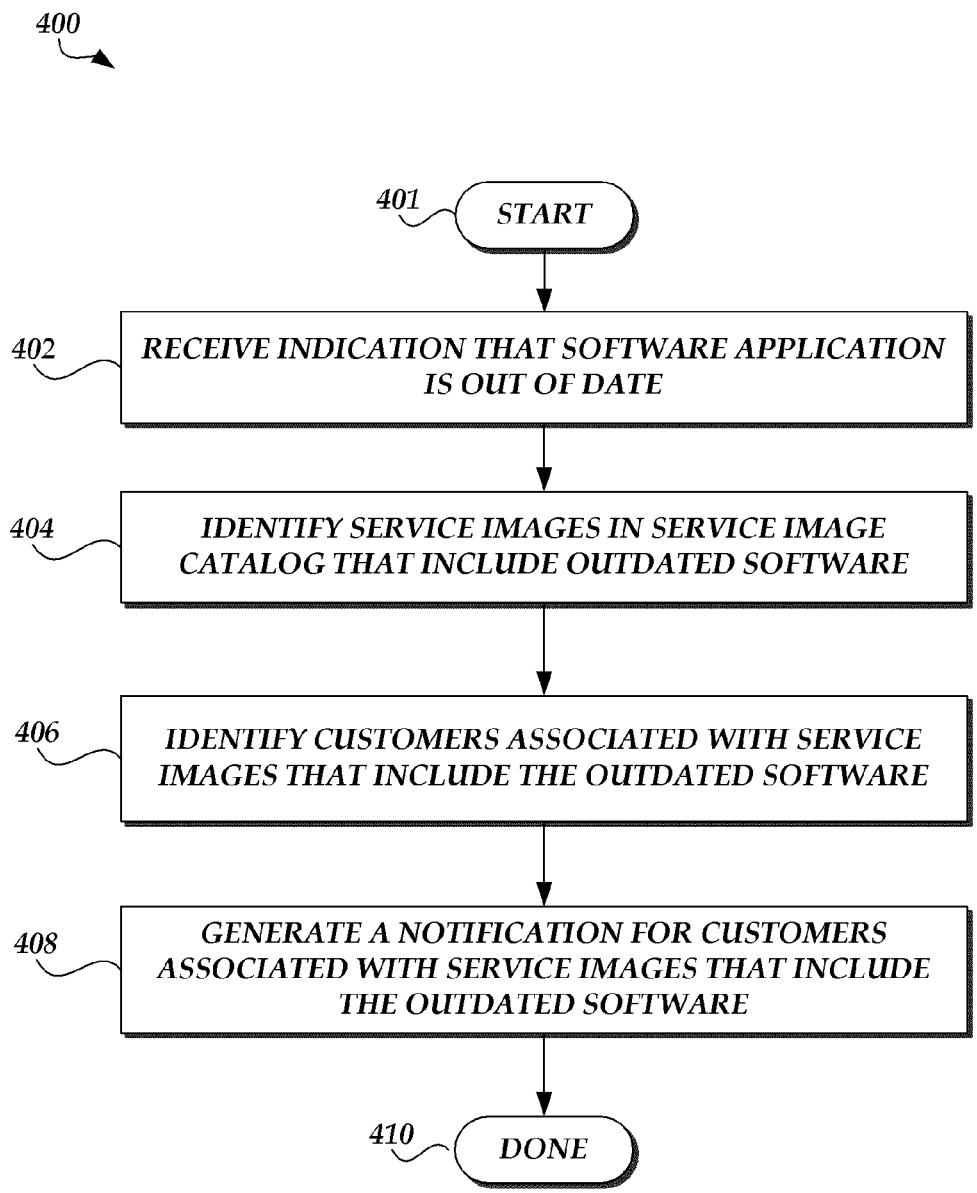
FIG. 4 is a flow diagram depicting an alternative, illustrative routine implemented by the marketplace server of the electronic service image marketplace to generate a notification regarding an outdated software application to customers associated with a service image that include the outdated software application.

FIG. 4 is a flow diagram depicting an alternative, illustrative routine 400 implemented by a marketplace server 112 to generate a notification regarding an outdated software application to affected customers associated with service images that include the outdated software application. For example, routine 400 can apply to embodiments described in reference to FIGS. 1 and 2.

One skilled in the relevant art will appreciate that the elements outlined for routine 400 may be implemented by one or more computing devices/components that are associated with the marketplace server 112 and/or electronic service image marketplace 100, described in greater detail above with reference to FIGS. 1 and 2. For example, routine 400 can be implemented by any one, or a combination, of marketplace server 112, the usage monitoring server 114, the billing server 118, the electronic catalog 116 and the provider/customer data store 120, and the like. Accordingly, routine 400 has been logically associated as being generally performed by a marketplace server 112, and thus the following illustrative embodiment should not construed as limiting.

At block 402, the marketplace server 112 receives an indication that a software application is out of date. As mentioned previously, the indication can be received from a provider 150 in the form of an email, control panel interaction, etc., and can include information providing additional details with respect to the outdated software application that may be contained within a service image of the electronic catalog 116. As mentioned previously, in an embodiment, the software application is a service image itself. As mentioned above with reference to block 302 of FIG. 3, the indication can include the name of the outdated software application, the name of the updated software application, as well as an identifier of the outdated software application, and the like.

At block 404, the marketplace server 112 identifies affected service images, such as service images within the electronic catalog 116 that include the outdated software application. To identify the affected service images, the marketplace server 112 can compare an identifier of the outdated software application with identifiers associated with the software applications contained within the service images in the electronic catalog 116. The identifiers can include, but are not limited to, a name and version number of the software application, a hash of the outdated software application, a serial number of the outdated software application, a service image marketplace identifier, a provider identifier and the like.

At block 406, the marketplace server 112 identifies customers associated with the affected service images. As discussed in greater detail above with reference to block 310 of FIG. 3, to identify the customers associated with the affected service images, the marketplace server 112 can query a provider/customer data store 120 for all customers that are associated with the affected service images. As mentioned previously, the provider/customer data store 120 includes information regarding the service images associated with the various customers using the electronic service image marketplace.

At block 408, the marketplace server 112 generates a notification for customers associated with the affected service images, as discussed in greater detail above with reference to block 312 of FIG. 3.

One skilled in the art will appreciate that routine 400 can include fewer, more, or different blocks than those illustrated in FIG. 4 without departing from the spirit or the scope of the description. For example, upon generating the notification for the customers associated with the affected service images, the marketplace server 112 can transmit the notification to the customer. Furthermore, the marketplace server 112 can receive a response from the customer associated with the affected service image requesting that the outdated software application be updated. Upon receiving the response from the customer to update the outdated software application, the marketplace server 112 can update the outdated software application.

Figure 5:
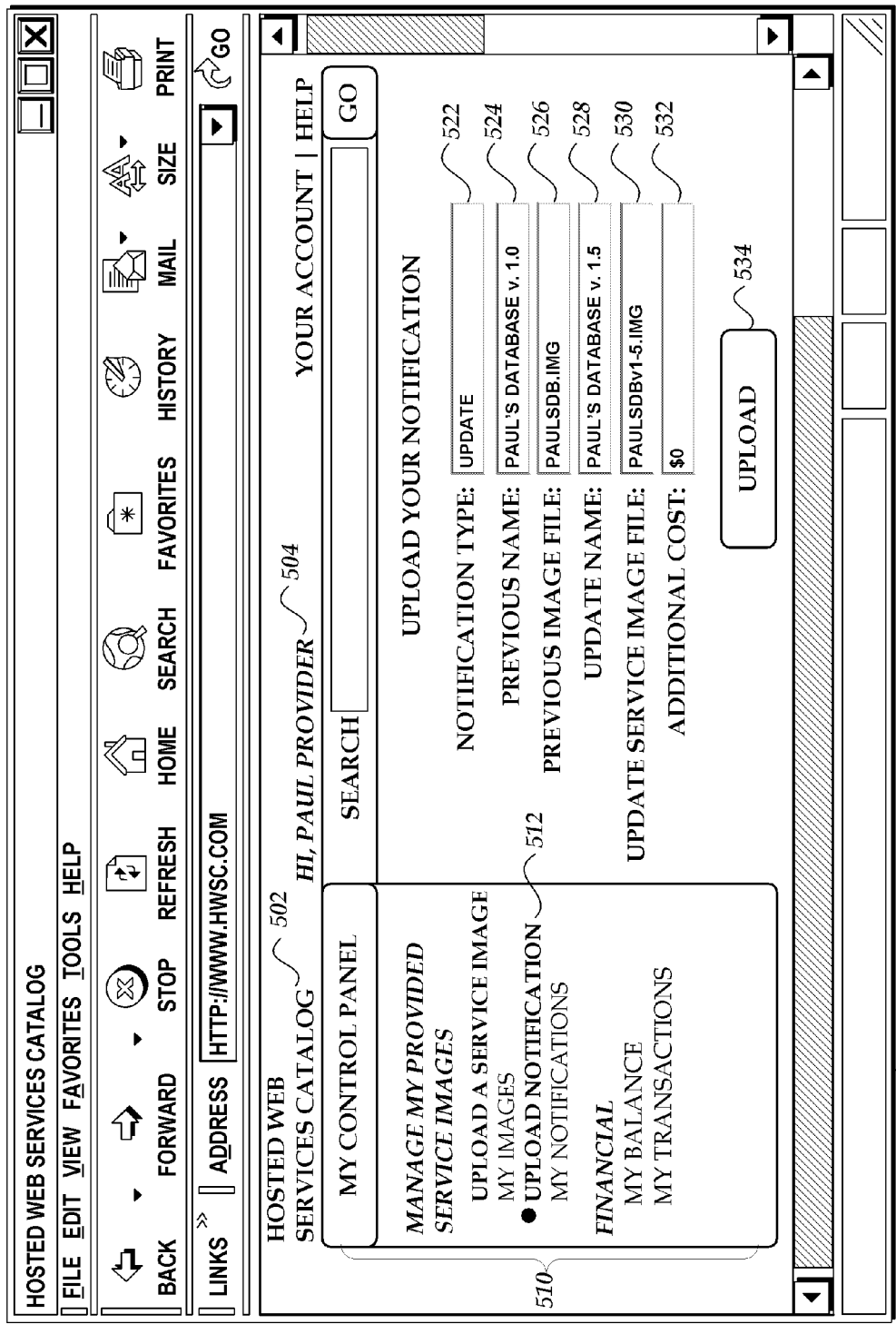
FIG. 5 depicts an illustrative user interface displayed on a provider computing device that enables a provider to submit a notification to be transmitted to the electronic service image marketplace.

FIG. 5 depicts an illustrative user interface 500 displayed on a provider computing device 150 that enables a provider to submit an updated service image for inclusion in the indication that a software application is out of date. As shown in FIG. 5, the user interface 500 enables a provider utilizing a provider computing device, such as provider computing device 150 of FIG. 1, to submit an updated software application to the electronic service image marketplace 100. Illustratively, the user interface 500 may be generated by the marketplace server 112 and presented on the provider computing device 150 by an application, such as a browser application, on the provider computing device 150. In this example the user interface 500 contains a title reference 502 to the electronic service image marketplace 100, i.e., the "Hosted Web Services Catalog," as well as a salutation 504 to the provider currently visiting the electronic service image marketplace 100. In the illustrated example, the provider is identified as "Paul Provider." The user interface 500 further contains a navigation panel 510, which directs the provider to various other features offered by the electronic service image marketplace 100. Illustratively, units of text within the navigation panel 510 may correspond to interactive links which modify or change the user interface when selected. In the current example, Paul Provider, has selected link 512, "upload notification." Based on this selection the marketplace service 112 has returned the content for user interface 500.

Through the user interface 500, the provider may submit information associated with an updated software application, which is part of a service image found in the electronic service image marketplace 100. The provider, utilizing the provider computing device 150, may submit, via input box 522, an identifier of the type of notification to be sent to the electronic service image marketplace 100. In the illustrated example, the type of the notification is an update; however, other types of notifications may be used, such as security alerts, changes to user agreements, suggestions for use, and the like.

The provider may submit additional information, such as, a name of the outdated software application, a file location of the outdated software application, a name of the updated software application, a file location of the updated software application, and pricing information via inputs 524-530. Input box 526 allows the provider to specify the name of the outdated software application and input box 530 allows the provider to specify the name of the updated software application. In the illustrated example, the outdated software application is named "Paul's Database v. 1.0" and the updated software application is named "Paul's Database v. 1.5." In the illustrated example, input boxes 526 and 530 depict that the outdated software application location and updated software application location are locations on the provider computing device 150, as is displayed in FIG. 1. In other embodiments, the software application files may be located on another computing device, such as a computing device within a provider hosted computer environment 152, or computing device within the marketplace hosted computer environment 122 associated with the electronic service image marketplace 100.

In some embodiments, electronic service image marketplace 100 may create an updated software application on behalf of the provider. For example, the provider may, instead of providing a location of an updated software application via input box 530, specify the location of a computing device. The electronic service image marketplace 100 may then locate the specified computing device, and create an updated software application reflecting the updated software that is to be run and/or current configuration of the computing device. Such functionality may be helpful in situations where the provider wishes to provide an updated software application which exists within the marketplace hosted computing environment 122. In the illustrated example, the input box 532 allows a provider to specify any additional pricing information associated with the updated software application, such as, any additional costs associated with accepting the update from "Paul's Database v. 1.0" to "Paul's Database v. 1.5". Once the provider is ready to upload the updated software application and transmit the notification to the electronic service image marketplace 100, the user may use the user interface object 534 to upload the notification. Upon selecting the user interface object 534, the provider computing device 150 transmits the notification to the electronic service image marketplace 100.

Figure 6:
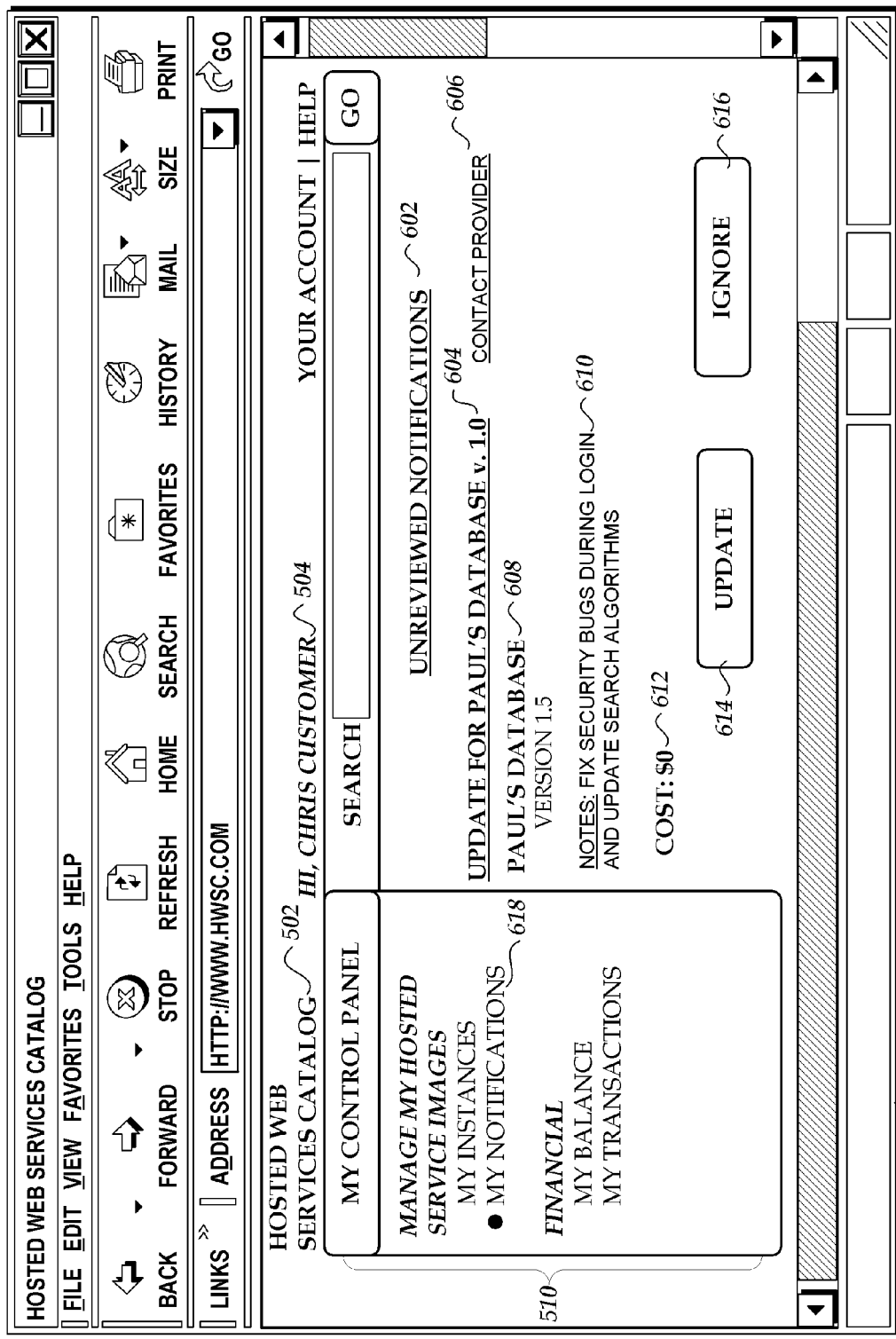
FIG. 6 depicts an illustrative user interface displayed on a customer computing device that presents information associated with a notification received from the service image marketplace.

FIG. 6 depicts an illustrative user interface 600 displayed on a customer computing device 140 that presents information associated with a notification regarding an updated software application received from the electronic service image marketplace 100. In one embodiment, user interface 600 is generated by the electronic service image marketplace 100 as a result of the navigation by the customer or as a result of selection of a search result returned by the electronic service image marketplace 100.

As shown in FIG. 6, the user interface 600 provides information retrieved from the electronic service image marketplace 100, i.e., the "Hosted Web Services Catalog" 502 to "Chris Customer" 504, an illustrative customer accessing the "Hosted Web Services Catalog." Because the customer is viewing details regarding a specific notification and may wish to browse to other notifications, navigation pane 510 is displayed.

Navigation pane 510 contains links that enable a customer to browse and select other service images or notifications available via the service images marketplace 100. Currently, the user interface 600 depicts information for a notification related to "Paul's Database," which corresponds to an updated software application uploaded by user Paul Provider, discussed previously with reference to FIG. 5.

Display feature 602 to 618 display information corresponding to the updated software application. Display feature 602 depicts that the notification is an unreviewed notification. Display feature 604 depicts that the unreviewed notification is for an update to Paul's Database v. 1.0. Display feature 606 allows the customer to contact the provider for additional information relating to the update. Display feature 608 and 610 depict information relating to the updated software application including specific information regarding the differences between the updated software application and the outdated software application. Display feature 612 depicts pricing information associated with the updated software application. As illustrated, user interface objects 614 and 616 may be used by the customer to select to update the outdated software application to the updated software application, or to continue using the outdated software application.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer implemented method for providing notification through an electronic marketplace that a software application of a service image offered in the electronic marketplace is out of date, wherein the service image comprises at least one software application and an identifier associated with the at least one software application, and wherein the service image executes on a hosted computing environment comprising a plurality of computing devices, wherein at least a subset of the plurality of computing devices implement service images on behalf of customers; said computer implemented method comprising:
   under control of one or more computing devices configured with specific executable instructions,
   receiving at the hosted computing environment an indication of an outdated software application from a second computing device that is under control of a third party, wherein the hosted computing environment generates a virtual computing device on behalf of a customer, and provisions the virtual computing device with a selected service image, and
   wherein the virtual computing device implements functionality corresponding to the selected service image and is distinct from additional virtual computing devices generated on behalf of additional customers;
   determining whether the outdated software application corresponds to a first software application of a first service image executing on the hosted computing environment;
   following determining that the outdated software application corresponds to the first software application, determining whether an identifier associated with the first software application corresponds to one or more identifiers associated with the outdated software application; and
   following determining that the identifier associated with the first software application corresponds to one or more identifiers associated with the outdated software application, generating a notification to a customer associated with the first service image that the first software application is out of date, wherein the notification is made available to the customer associated with the first service image via a client computing device that is distinct from the hosted computing environment.

2. The computer implemented method of claim 1, wherein the identifier associated with the first software application is a software version number.

3. The computer implemented method of claim 1, wherein the identifier associated with the first software application is a result of hashing the first software application.

4. The computer implemented method of claim 1, wherein the first software application is the first service image.

5. The computer implemented method of claim 1, wherein the receiving the indication of the outdated software application occurs as a result of polling a service that provides indications of outdated software applications.

6. The computer implemented method of claim 1, wherein the receiving the indication of the outdated software application comprises receiving a push message from a service that provides indications of outdated software applications.

7. A computer implemented method for providing notification that a software application of a service image executing on a hosted computing environment, is out of date, wherein the service image comprises at least one software application, wherein said hosted computing environment comprises a plurality of computing devices, and wherein at least a subset of the plurality of computing devices implement service images on behalf of customers, said computer implemented method comprising:
   under control of one or more computing devices with specific executable instructions,
   receiving at the hosted computing environment an indication of an outdated software application from a second computing device that is under control of a third party, wherein the hosted computing environment generates a virtual computing device on behalf of a customer, and provisions the virtual computing device with a selected service image, and
   wherein the virtual computing device implements functionality corresponding to the selected service image and is distinct from additional virtual computing devices generated on behalf of additional customers;
   identifying a first service image in an electronic catalog including the outdated software application;
   identifying a customer associated with the first service image including the outdated software application; and
   generating a notification to the customer associated with the first service image including the outdated software application that the outdated software application is out of date, wherein the notification is made available to the customer associated with the first service image via a client computing device that is distinct from the hosted computing environment.

8. The computer implemented method of claim 7, wherein the identifying the first service image comprises comparing an identifier associated with the outdated software application with an identifier associated with a first software application of the first service image.

9. The computer implemented method of claim 8, wherein the identifier associated with the first software application is a software version number.

10. The computer implemented method of claim 8, wherein the identifier associated with the first software application is a result of hashing the first software application.

11. The computer implemented method of claim 7, wherein the outdated software application is the first service image.

12. The computer implemented method of claim 7, wherein the notification comprises a security update.

13. The computer implemented method of claim 7, wherein the notification comprises an indication that an update for the outdated software application of the first service image is available.

14. The computer implemented method of claim 7, wherein the notification comprises one or more updates for the outdated software application of the first service image.

15. The computer implemented method of claim 7, wherein the notification comprises an indication that the outdated software application of the first service image has been updated.

16. The computer implemented method of claim 7, further comprising:

receiving an indication from a first computing device associated with the customer to update the outdated software application of the first service image; and updating the outdated software application of the first service image.

17. The computer implemented method of claim 7, wherein the receiving the indication of the outdated software application occurs as a result of polling a service that provides indications of outdated software applications.

18. The computer implemented method of claim 7, wherein the receiving the indication of the outdated software application comprises receiving a push message from a service that provides indications of outdated software applications.

19. A system having one or more processors for providing notification that a software application of a service image is out of date, the system comprising:

an electronic catalog configured to store a plurality of service images, wherein each service image of the plurality of service images is capable of being executed in a hosted computing environment comprising a plurality of computing devices, wherein at least a subset of the plurality of computing devices implement service images on behalf of customers, and wherein each service image comprises at least one software application and an identifier associated with the at least one software application; and a computing device in communication with the electronic catalog, the computing device configured to:

receive an indication of an outdated software application from a second computing device that is under control of a third party, wherein the hosted computing environment generates a virtual computing device on behalf of a customer, and provisions the virtual computing device with a selected service image, and wherein the virtual computing device implements functionality corresponding to the selected service image and is distinct from additional virtual computing devices generated on behalf of additional customers;

determine whether an identifier associated with a first software application of a first service image corresponds to one or more identifiers associated with the outdated software application; and following the determination that the identifier associated with the first software application corresponds to one or more identifiers associated with the outdated software application, generate a notification to a customer associated with the first service image that the first software application is out of date, wherein the notification is made available to the customer associated with the first service image via a client computing device that is distinct from the hosted computing environment.

20. The system of claim 19, wherein the identifier associated with the first software application is a software version identifier.

21. The system of claim 19, wherein the identifier associated with the first software application is a result of hashing the first software application.

22. The system of claim 19, wherein the notification comprises an indication that an update for the outdated software application is available.

23. The system of claim 19, wherein the notification comprises one or more updates for the outdated software application.

24. The system of claim 19, wherein the notification comprises an indication that the first software application has been updated.

25. The system of claim 22, wherein the computing device is further configured to:

receive an indication from a customer computing device associated with the customer to update the first software application of the first service image; and update the first software application of the first service image.

26. A computer readable, non-transitory storage medium having one or more computer executable modules for providing notification that a software application of a service image is out of date, the one or more computer executable modules comprising:

a marketplace module in communication with an electronic catalog configured to store a plurality of service images, wherein each service image of the plurality of service images is capable of being executed in a hosted computing environment comprising a plurality of computing devices, wherein at least a subset of the plurality of computing devices implement service images on behalf of customers, and wherein each service image comprises at least one software application and an identifier associated with the at least one software application, the marketplace module configured to:

receive an indication of an outdated software application from a second computing device that is under control of a third party, wherein the hosted computing environment generates a virtual computing device on behalf of a customer, and provisions the virtual computing device with a selected service image, and wherein the virtual computing device implements functionality corresponding to the selected service image and is distinct from additional virtual computing devices generated on behalf of additional customers;

determine whether an identifier associated with the outdated software application corresponds to an identifier associated with a first software application of a first service image stored in the electronic catalog;

following the determination that the identifier associated with the first software application corresponds to the identifier associated with the outdated software application, identify a customer associated with the first service image; and generate a notification to the customer associated with the first service image that the first software application is out of date, wherein the notification is made available to the customer associated with the first service image via a client computing device that is distinct from the hosted computing environment.

27. The computer readable, non-transitory storage medium of claim 26, wherein the identifier associated with the first software application is a result of hashing the first software application.

28. The computer readable, non-transitory storage medium of claim 26, wherein the notification comprises an indication that an update for the outdated software application is available.

29. The computer readable, non-transitory storage medium of claim 26, wherein the marketplace module is further configured to:

receive an indication from a first computing device associated with the customer to update the first software application of the first service image; and update the first software application of the first service image.

\* \* \* \* \*